(No Model.)
F. MARX.
SECONDARY BATTERY.
No. 440,175. Patented Nov. 11, 1890.
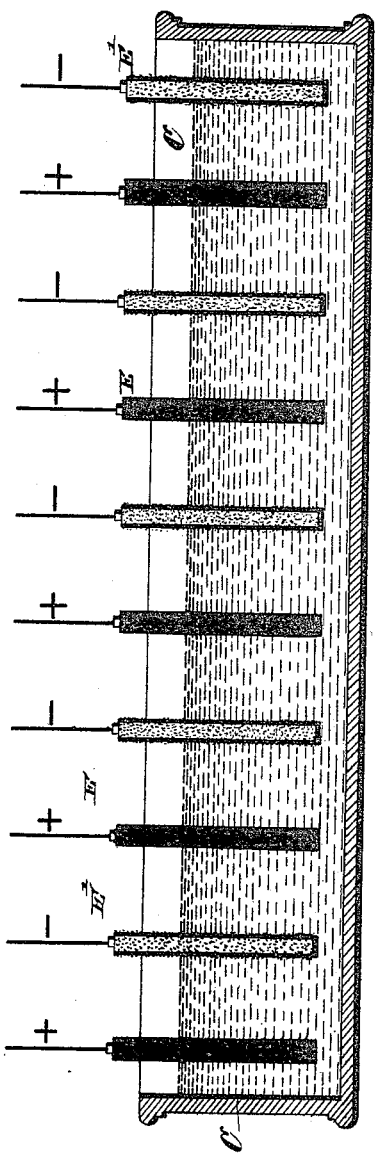
Witnesses:
Henry G. Dieterich
J. Thomson Cross
Inventor:
Friedrich Marx
per
Attorney

UNITED STATES PATENT OFFICE.

FRIEDRICH MARX, OF BERLIN, GERMANY.

SECONDARY BATTERY.

SPECIFICATION forming part of Letters Patent No. 440,175, dated November 11, 1890.

Application filed April 18, 1890. Serial No. 348,489. (No model.) Patented in France December 24, 1889, No. 202,781; in England December 24, 1889, No. 20,751; in Belgium March 26, 1890, No. 89,988; in Switzerland March 26, 1890, No. 2,178; in Luxemburg March 27, 1890, No. 1,265; in Italy March 31, 1890, XXIV, 27,357, LIII, 428, and in Spain May 8, 1890, X, 543, No. 10,634.

*To all whom it may concern:*

Be it known that I, FRIEDRICH MARX, chemist, a subject of the German Emperor, residing at 225 Friedrichstrasse, Berlin, German Empire, have invented certain new and useful Improvements in Electrolin Accumulators, (for which I have obtained Letters Patent in Belgium March 26, 1890, No. 89,988; in Luxemburg March 27, 1890, No. 1,265; in Switzerland March 26, 1890, No. 2,178; in Spain May 8, 1890, libro 10, folio 543, No. 10,634; in Italy March 31, 1890, 24 / 27,357, 53 / 428; in France December 24, 1889, No. 202,781, and in Great Britain December 24, 1889, No. 20,751;) and I do hereby declare the following to be a full, clear, and exact description of the invention, such as will enable others skilled in the art to which it appertains to make and use the same, reference being had to the accompanying drawing, and to the letters of reference marked thereon, which form a part of this specification.

The invention relates to improvements in accumulating or storage batteries, and is an improvement on my invention described and illustrated in my application for patent of the United States, Serial No. 318,105, filed on or about July 20, 1889.

In the application just above referred to I have described a mode of producing an electro-chemical composition for use in accumulating or storage batteries in which carbon electrodes only are used in the process of obtaining the electro-chemical composition. By this process it is necessary to substitute a metallic electrode for one of the carbon electrodes in the discharge of the electricity, so that the battery used for producing the electrolin cannot be used for the discharging of the electricity without first substituting a metallic electrode for one of the carbon electrodes. This invention is designed to avoid this difficulty by the use of a carbon and a suitable or a more or less metallic electrode in a suitable solution of a salt of a metal in the presence of an equivalent quantity of an acid, as will now be more fully described, reference being had to the accompanying figure of drawing, which shows by a longitudinal vertical section an accumulating or storage or secondary battery arranged and constructed according to my invention.

In the vessel or cell C are arranged in alternate order any desired number of carbon and iron electrodes E and E', arranged at suitable distances apart, the carbon electrode E being connected with the positive and the iron electrode E' with the negative pole of the electrical source, (battery, dynamo, &c.) The cell is then filled with an aqueous solution of equivalent quantities of protochloride of iron and muriatic acid—for instance, by dissolving, say, about four hundred and fifty grams of the protochloride in five hundred grams of twenty-five per cent. muriatic acid and nine hundred grams of water—the electrodes being connected up and a current passed therethrough and through the solution. The formation of the electrolin takes places at once without deposition of metal, and the termination of the process may be ascertained by the peculiar change in color of the solution, which turns brown, while the cell at the same time begins to get warm. The iron electrodes are then lifted out of the cell, and the electrolin so formed is ready for use by returning the iron electrodes and connecting up the elements for use in a well-known manner; or, if desired, the electrolin obtained may be transferred to a suitable vessel and used at any desired point in a cell similar to the one above described.

The iron electrodes will of course be affected by the acid solution; but this I avoid, as follows: I form an electrode by combining iron filings or dust with carbon and with a binding material—such as coal-tar, for instance—after which they are coated with tar dusted over with carbon dust or finely-comminuted carbon and again air dried and baked and provided with suitable binding-posts or other means for connecting them with the electrical source or the apparatus in conjunction with which the stored electricity is to be used. Any suitable carbon—such as what is known as "retort carbon," for instance—may be used.

By employing an electrode constructed as described, it will not be necessary to remove the same from the cell after the conversion of the solution, as such electrode will not be affected by the solution, yet there is sufficient potential difference between the compound electrodes and the carbon electrodes as to adapt them for the uses for which they are intended.

In making the compound electrodes I prefer to use about equal quantities of carbon and metal. Finally, it may be noted that in discharging the accumulated or stored electrical energy the current flows in a reverse direction to that in charging or converting the solution. The accumulator or storage battery is also distinguished from all others, in that no deposition takes place at the electrodes.

Having described my invention, what I claim, and desire to secure by Letters Patent, is—

1. A secondary or storage battery consisting of a metal or metalline electrode and a carbon electrode, said electrodes being placed in an aqueous solution of a salt of a metal and an equivalent quantity of an acid, substantially as set forth.

2. A secondary or storage battery consisting of alternately-arranged carbon and metalline electrodes, said electrodes being placed in an aqueous solution of a salt of a metal and an equivalent quantity of an acid, and said metalline electrodes being coated with a conductive material not affected by the solution, as described, for the purposes specified.

3. A secondary or storage battery consisting of a carbon electrode and a compound electrode composed of carbon and metal, said electrodes being placed in an aqueous solution of a salt of a metal corresponding with that of the compound electrode and an equivalent quantity of an acid, as described, for the purposes specified.

4. A compound electrode for secondary or storage batteries composed of carbon and a metal and rendered resistant by an envelope or coating of carbon only, as and for the purpose specified.

5. A compound electrode consisting of a plate composed of a metal and carbon provided with an outer coating or envelope of carbon, as set forth.

In testimony whereof I affix my signature in presence of two witnesses.

FRIEDRICH MARX.

Witnesses:
G. LOUBIËR,
ADOLF DEMSHINS.